(No Model.)
E. WESTON.
ELECTRICAL MEASURING INSTRUMENT.
No. 446,492. Patented Feb. 17, 1891.
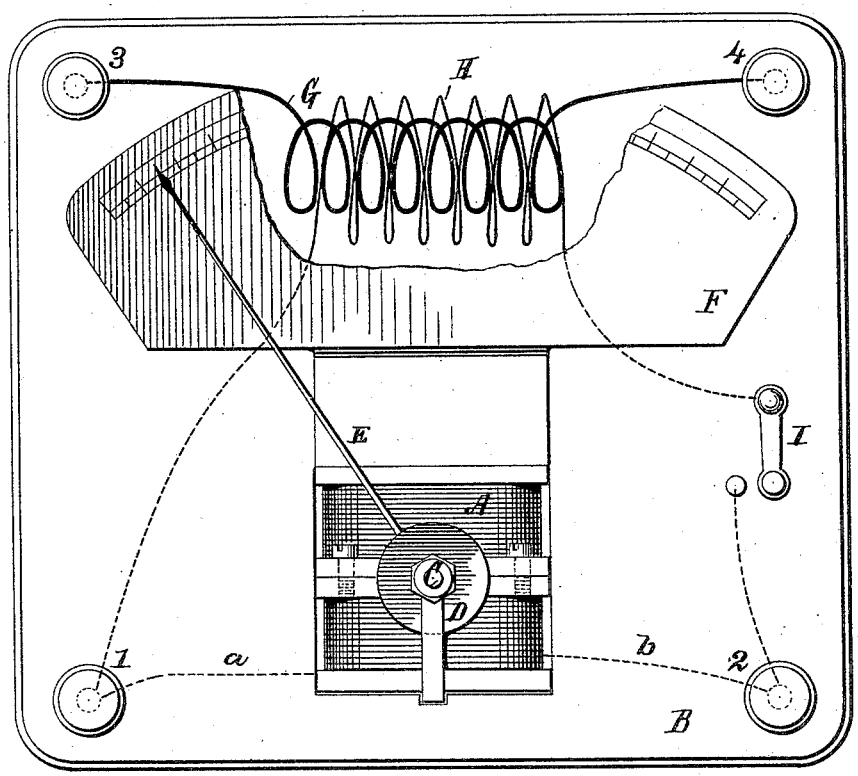
WITNESSES:
Gustave Dieterich.
M. Bosch.
INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 446,492, dated February 17, 1891.

Application filed July 1, 1890. Serial No. 357,334. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an instrument for the measurement of alternating currents of electricity; and it consists in the combination in such an instrument of a primary conductor, a secondary conductor, and two coils included in said secondary conductor, one of said coils being movable in the field of the other.

The accompanying drawing is a plan view of my instrument, showing the scale-plate broken away and the converter or induction-coil represented diagrammatically.

The instrument here shown to which my invention is applied is designed for the measurement of alternating currents, and is the same in general construction as that illustrated in Letters Patent No. 433,637, granted to me August 5, 1890.

A is a coil of insulated wire supported on a suitable base-board B. Pivoted within the coil A is a second coil, (not shown,) also of insulated wire, the pivot-shaft C of which carries a disk D, to which is fastened the index-needle E, which extends over the scale-plate F. The coils are electrically connected with each other and by the wires $a$ $b$ with the binding-posts 1 and 2. The current to be measured enters at binding-post 1, for example, traverses the coils, and leaves at post 2. The inner coil then takes an angular position, dependent upon the difference in electrical potential between the terminals 1 and 2, and the index-needle E indicates on the scale the extent of angular movement of the moving coil, so that the pressure of current in volts, for example, may thus be indicated.

The aforesaid arrangement and operation of parts are fully set out in my aforesaid application, and therefore form no part of my present invention, which has for its object an increase of capability of the instrument, so that it may be used to determine the pressure not merely of currents of low strength, but of currents of high strength, which could not be passed through the instrument-coils without injuring the latter.

My invention obviates the necessity of shunt-measurements and allows of the pressure of the heaviest ampère-currents being at once directly determined. To this end I provide between the binding-posts 3 and 4 a conductor G of sufficient cross-sectional area to safely carry currents of the highest strength likely to be dealt with. This conductor, which may be in coil form, is the primary of the converter or induction coil of which the wire H is the secondary. Wire H is in circuit with binding-posts 1 and 2 and with the instrument-coils when the switch-lever I is turned so as to close the secondary circuit. In measuring the voltage of currents of low ampère strength the lever I is opened and the circuit-terminals are connected with the binding-posts 1 and 2. The current then traverses the coils, and the needle indicates the pressure on the scale. When the ampère strength is high, the circuit-terminals are connected to the binding-posts 3 and 4 and the lever I is closed, when the converter then operates in accordance with well-known laws, so that the pressure of the current induced in the secondary circuit H will be proportional to the strength of the current traversing the primary G. The converter-coils are to be proportioned and the scale so marked that a given voltage for a given ampère strength will be indicated—thus, for example, one hundred volts indication for one hundred ampère currents strength, and so on, or for a given scale-marking the multiplication in the converter-coils is made correspondingly. The converter may be of any suitable construction and provided with the usual metal core.

I claim—

1. In an electrical measuring-instrument, two independent means of producing a field of force and a conductor extending in inductive relation to both fields and having a portion of its length movable in one of them.

2. In an electrical measuring-instrument, two independent means of producing a field of force, a conductor extending in inductive relation to both fields and having a portion of its length movable in one of them, and means for determining the extent of movement of said conductor.

3. In an electrical measuring-instrument, a means of producing a field of force, a conductor in inductive relation to said field and so producing a second field, and a movable conductor in inductive relation to said second field.

4. In an electrical measuring-instrument, a means of producing a field of force and a conductor in inductive relation to said field and so producing a second field, in which second field a movable portion of said conductor is inductively disposed.

5. The combination, in an electrical measuring-instrument, of a primary conductor, a secondary conductor, and two coils, the said coils being in the secondary circuit and one coil movable in the field of force of the other.

6. The combination, in an electrical measuring-instrument, of a primary conductor, a secondary conductor, two coils, one of said coils movable in the field of force of the other, both of said coils being in the secondary circuit, and means for indicating the extent of movement of said movable coil.

7. The combination, in an electrical measuring-instrument, of a primary conductor, a secondary conductor, a fixed coil, a movable coil in the field of said fixed coil, both of said coils being in the secondary circuit, a circuit-breaker, and means for indicating the extent of movement of said movable coil.

EDWARD WESTON.

Witnesses:
K. W. ELY,
R. C. FESSENDEN.